US009288624B2

(12) United States Patent
Erol et al.

(10) Patent No.: US 9,288,624 B2
(45) Date of Patent: Mar. 15, 2016

(54) ACCELERATED LOCATION INFORMATION ACQUIRING SYSTEM AND METHOD

(75) Inventors: Ahmet Erol, Ankara (TR); Omer Agah Duran, Ankara (TR); Erinc Deniz Bardak, Ankara (TR); Huseyin Erturk Cetin, Ankara (TR); Tunc Tekelioglu, Ankara (TR); Yasar Kalay, Ankara (TR); Ozan Kusmen, Ankara (TR)

(73) Assignee: ASELSAN ELEKTRONIK SANAYI VE TICARET ANONIM AIRKETI, Ankara (TR)

( * ) Notice: Subject to any disclaimer, the term of this patent is extended or adjusted under 35 U.S.C. 154(b) by 166 days.

(21) Appl. No.: 14/116,344

(22) PCT Filed: Dec. 19, 2011

(86) PCT No.: PCT/IB2011/055779
§ 371 (c)(1),
(2), (4) Date: Nov. 8, 2013

(87) PCT Pub. No.: WO2013/064871
PCT Pub. Date: May 10, 2013

(65) Prior Publication Data
US 2014/0087756 A1 Mar. 27, 2014

(30) Foreign Application Priority Data
Oct. 31, 2011 (TR) .............................. a 2011 10801

(51) Int. Cl.
*H04W 24/00* (2009.01)
*H04W 4/02* (2009.01)
*H04W 64/00* (2009.01)

(52) U.S. Cl.
CPC .............. *H04W 4/023* (2013.01); *H04W 64/00* (2013.01)

(58) Field of Classification Search
CPC ......... G01S 5/14; G01S 19/258; G01S 19/07; G01S 5/02; G01S 5/10; G01S 5/021; G01S 5/0273; H04Q 7/38; H04W 4/023; H04W 64/00
See application file for complete search history.

(56) References Cited

U.S. PATENT DOCUMENTS 6,133,874 A * 10/2000 Krasner ................ G01S 19/235
342/357.43
6,323,803 B1 * 11/2001 Jolley ...................... G01S 5/009
342/357.42

(Continued)

FOREIGN PATENT DOCUMENTS

WO    WO 2008057719 A2    5/2008

*Primary Examiner* — Mahendra Patel
(74) *Attorney, Agent, or Firm* — Gokalp Bayramoglu (57) ABSTRACT

The present invention relates to a location information acquiring system developed to be used in professional trunked radio devices, comprising a global location data organization unit (4) wherein the locations of the subscribers can be acquired one after another sending location queries to a plurality of radios at the same time, which makes channel use more efficient, which can perform global location data transmission swiftly, which is in communication with the wireless communication unit (5), and which is adapted such that it will perform location queries to a plurality of subscriber radios (2) at the same time and acquiring the location information of the said radios (2), a global location data transmission unit (8) which is adapted such that it will perform the transmission of location information when it is radio's (2) turn, and a timer (14); and a method comprising the steps of sending, receiving query, and sending location information with timing.

23 Claims, 3 Drawing Sheets

(56) References Cited

U.S. PATENT DOCUMENTS

| | | | |
|---|---|---|---|
| 2002/0077116 A1* | 6/2002 | Havinis | H04W 4/02 455/456.6 |
| 2003/0154270 A1* | 8/2003 | Aranda, Jr. | G08B 13/19656 709/223 |
| 2004/0017311 A1* | 1/2004 | Thomas | G01S 5/0215 342/450 |
| 2004/0110514 A1* | 6/2004 | Kim | H04W 64/00 455/456.1 |
| 2004/0266459 A1* | 12/2004 | Lee | 455/456.6 |
| 2005/0192024 A1* | 9/2005 | Sheynblat | G01S 5/0263 455/456.1 |
| 2006/0238418 A1* | 10/2006 | Monnerat et al. | 342/357.09 |
| 2006/0276198 A1* | 12/2006 | Michelon | G01S 19/46 455/456.1 |
| 2010/0159824 A1* | 6/2010 | Goodjohn | 455/11.1 |
| 2011/0059755 A1 | 3/2011 | Kim | |

* cited by examiner

ACCELERATED LOCATION INFORMATION ACQUIRING SYSTEM AND METHOD

FIELD OF THE INVENTION

The present invention relates to a location information acquiring system and methods developed to be used in especially professional trunked radio equipment.

BACKGROUND OF THE INVENTION

Telecommunication, one of the indispensable elements of our era, is realized and developed with many different methods and aims. Except the communication devices such as television, cellular phone which are used frequently, radio networks which the public security officers use and which are based on the ground of wireless communication are still being developed and widely used. The communication performed through the analogue channels which used to be selected manually with the said radio devices and networks has been developed until today and systems based on digital data communication are established wherein more than one radio can communicate through a single channel via trunked radio systems. Trunked radio system is one of these which are most commonly used.

Today analogue radio systems are still used, but it loses its generality because it cannot meet the needs in some cases. For example, when the locations of the radios in the network are desired to be found swiftly, the locations are required to be learnt vocally one by one by communicating with each radio since the analogue systems are not suitable for data communication. In this case, the possibility that there is no person to answer any time at each station makes difficult to learn the locations of the devices. In order to make this process easy, systems which gives approximate information with shared analysis of the distance mobile radio device to the certain stations by measuring the signal intensity have been developed, however a more modern technique wherein the radio on which a global positioning system is located developed only for this process informs about the location through a digital data channel has gone beyond the said method. GPS (Global Positioning System) can be shown as an example of the said systems. GPS modules can determine the location of the GPS receiver accurately by performing time correction generally from a fourth satellite according to the signal durations it receives from the satellites, and reports as latitude, longitude and height information.

In radio systems having digital data communication, the data are sent directly or indirectly to the receiver in packages through the various channel units with constant or variable frequency and reach the right terminal/station targeted. FDMA (or Frequency Division Multiple Access). TIA-102 can be shown as example for the said communication platforms. For example TSBK (Trunking Signalling Block) is used for data communication. An exemplary TSBK is shown in Table 1.

TABLE 1

| Octet 0 | LB | P | Opcode | | | | |
|---|---|---|---|---|---|---|---|
| Octet 1 | | | (Manufacturer's ID) | | | | |
| Octet 2 | | | Parameters(Arguments) | | | | |
| Octet 3 | | | | | | | |
| Octet 4 | | | | | | | |
| Octet 5 | | | | | | | |
| Octet 6 | | | | | | | |
| Octet 7 | | | | | | | |
| Octet 8 | | | | | | | |
| Octet 9 | | | | | | | |
| Octet 10 | | | TSBK | | | | |
| Octet 11 | | | CRC | | | | |
| Bit | 7 | 6 | 5 | 4 | 3 | 2 | 1 | 0 |

The radio modules, used today and having a GPS receiver thereon, uses various methods to transfer the location information received from the GPS. Again, performing data communication through standard platforms developed for trunked radio systems provides advantage in sending the said data. In this kind of communication systems during sending the global location information periodically (active) or upon the demand of the system (passive), the data are acquired either from the same channel or another determined channel. When such system is used, in location information transmission performed periodically from the terminal or the subscribers, collisions occur relating to GPS data acquiring from a plurality of radios; enough coordinate information in desired timing cannot be acquired from the system. In sending GPS upon request (passive) technique, data channel request messages of the radios may collide with any vocal or the like service request message of other radios, and this cause both the GPS data acquiring process to hinder and delays in other services getting service.

Today, in FDMA Digital Communication systems, during GPS data query from the radio/radios actively, generally the radio changes the channel after receiving the query, informs the other party performing messaging such as "arrived in channel" and "ready", then sends GPS data, returns to the channel where it is waiting and sends another message about ending the process. When the steps of the said system are followed, many channel changes are required, location query durations extend and radio channels (for example traffic channel) are kept busy unnecessarily. Besides, data can be requested/questioned only from one radio once with the current technique and the same process is repeated for all radios separately.

International patent document no WO 1998048294, an application known in the state of the art, discloses a positioning system which determines the location of a mobile device by using differences of the signal time of arrival received by at least one positioning radio receiver and originating from the signal detection speeds of the components within the said devices.

Chinese patent document no CN101478729 discloses a method which realizes the GPS positioning of mobile terminal with MPT-1327 trunking communication and acquires the data coming from the GPS module at the mobile terminal with the data communication realized actively and passively through the control and traffic channels by processing in the system.

Korean patent document no KR20070006127, an application known in the state of the art, discloses a geographical information providing method which transmits the customer information to the taxi by finding the closest taxi to the customer with the aim of providing convenience for the customer, and acquires these in a storage device and uses trunked radio systems.

SUMMARY OF THE INVENTION

The objective of the present invention is to realize an accelerated location information acquiring system and method wherein the information of the subscribers can be acquired one after another by sending location queries to more than one radio at the same time.

A further objective of the present invention is to realize an accelerated location information acquiring system and method which decreases the residence duration in traffic channel by making the channel use more efficient and realizes global location data transmission swiftly by offering this service to more radios in same duration.

DETAILED DESCRIPTION OF THE INVENTION

The accelerated location information acquiring system and method developed to fulfill the objective of the present invention is illustrated in the accompanying figures wherein.

Figure 1:
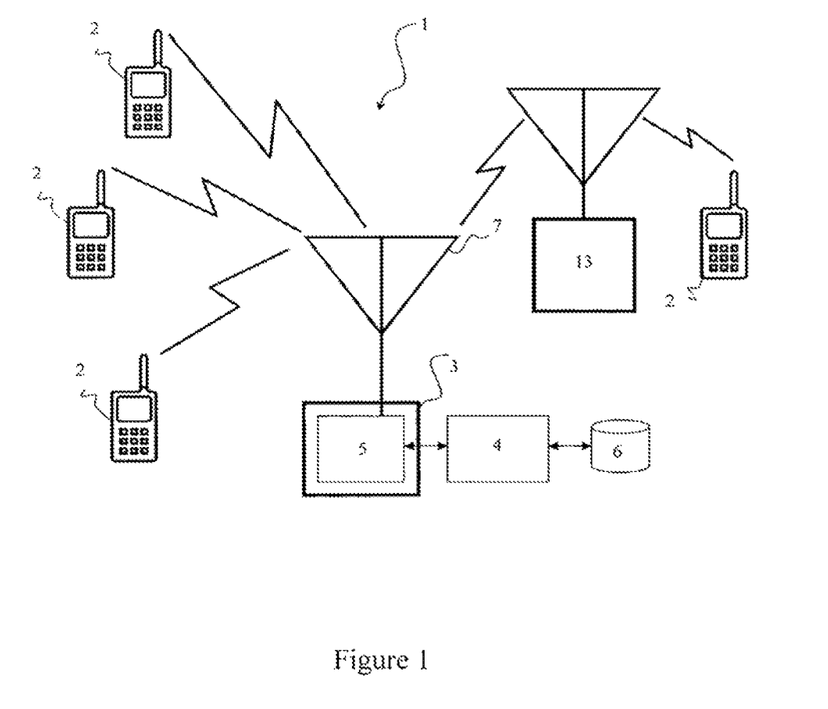
FIG. 1 is the schematic view of the inventive accelerated location information acquiring system.

The parts in the figures are each given a reference numeral where the numerals refer to the following:
1. Accelerated location information acquiring system
2. Subscriber radio
3. Main communication unit
4. Global location data organization unit
5. Wireless communication unit
6. Database
7. Wireless communication antenna
8. Global location data transmission unit
9. Communication unit
10. Antenna
11. Global location receiver
12. Global location receiver antenna
13. Repeater
14. Timer An accelerated location information acquiring system (1) which decreases the channel occupation duration by making the channel use more efficient and acquires location information swiftly comprises
  at least one main communication unit (3) having at least one wireless communication unit (5) which realizes wireless digital data communication through at least one channel (it is also used as module which is communicated in at least one frequency), and is connected to at least one wireless communication antenna (7),
  at least one repeater (13) which repeats the signals it receives and enables the main communication unit (3) to communicate with a subscriber radio (2) which is out of range,
  at least one subscriber radio (2) having at least one global location receiver (11) which is in corresponding communication with the main communication unit (3) through at least one communication unit (9) and acquires current location information,
  a global location data transmission unit (8) which is adapted to receive location queries from the global location receiver (11) and send the location information when it is radio's (2) turn, and at least one timer (14) which is in connection with this,
  a global location data organization unit (4) which communicates with wireless communication unit (5), and which is adapted to send location queries to more than one subscriber radio (2) at the same time and to acquire the location information of the said radios (2) one by one. (FIG. 1, 2).

The main communication unit (3) is preferably located in a radio command center serving radio users (for example firemen in a fire department) and enables communication between a subscriber radio (2) and the other subscriber radio(s) (2) or between the subscriber radio(s) (2) and the officers. Data can be sent to the main communication unit (3) or transmitted from it and the required input-output systems are present in the main communication unit (3). (For example a microphone and related A/D converters or at least one computer/monitor in order to follow the data).

In a preferred embodiment of the invention, the wireless communication unit (5) has a transmitter/receiver compatible with the trunked radio systems. The wireless communication unit (5) in the main communication unit (3) broadcasts and receives from at least one data channel working at least one frequency. The wireless communication unit (5) can broadcast preferably from at least one control channel from which the various commands can be sent to the subscriber radios (2) and/or at least one traffic channel wherein the subscribers (2) can perform data transfer (for example real-time talking). In one embodiment of the invention, the wireless communication unit (5) is also used as a radio station and is adapted such that it will acquire data packages, and distribute to the receivers through various data channels by arranging.

In a further preferred embodiment of the invention, the wireless communication unit (5) sends and receives data from a dedicated channel for global location communication in order to make radio channels less occupied during managing the location information (sending query and acquiring location information).

In a further preferred embodiment of the invention, control (primary control, secondary control or auxiliary control) and/or traffic channel information are assigned automatically by the wireless communication unit (5) to each registered subscriber radio (2), which will be in communication with the system, in order to prevent confusion in the lines. In a further preferred embodiment of the present invention, control, traffic and/or global location communication channel information dedicated to the subscriber radio(s) (2) are preferably kept at an electronic storage field in the wireless communication unit (5) which is also used as a radio station. The said storage field is preferably an internal field in the wireless communication unit (5) or any other cabled/wireless network or online database wherein the wireless communication unit is connected. The said database is preferably a database wherein the local communication channels in a radio site are kept.

In a further preferred embodiment of the invention, control and/or traffic channel information are assigned to the subscriber radio(s) (2) actively according to the channel intensity and updated in the storage field in the wireless communication unit (5). By this means the channels are enabled to be used efficiently.

Figure 2:
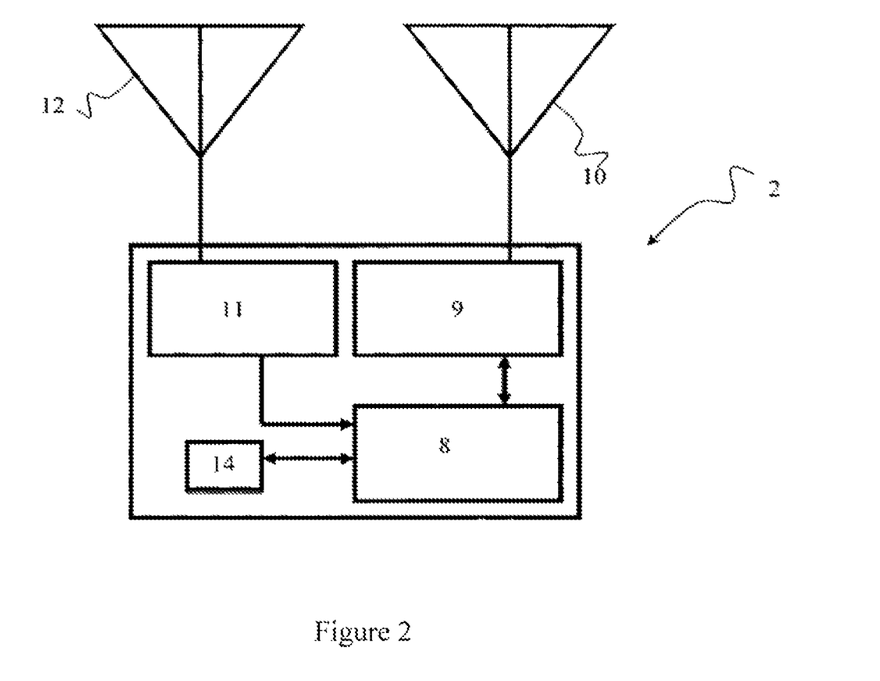
FIG. 2 is the schematic view of a subscriber radio according to the inventive accelerated location information acquiring system.

In the preferred embodiment of the invention, the subscriber radio(s) (2) can transfer data with the main communication unit (3) by using the communication unit (9) thereon and can send and receive data from the other subscriber radio(s) (2) through the main communication unit (3). In a preferred embodiment of the invention, the communication unit (9) on the subscriber radio(s) has a transmitter/receiver compatible with the trunked radio systems. The said communication unit (9) can broadcast from at least one data channel working in various frequencies which can be communicated preferably compatible with the main communication unit (3).

The communication unit (9), which the subscriber radio (2) has, is connected to an antenna (10) in order to perform wireless communication, and the global location receiver (11) is connected to a global location receiver antenna (12). Latitude, longitude and height information acquired according to the signals received from plurality of global positioning satellites with the global location receiver antenna (12) are sent to the global location transmission unit (8) and transmitted to the main communication unit (3) preferably in accordance with the request of the global location data organization unit (4).

In the preferred embodiment of the invention, a global location data organization unit (4) communicates with the wireless communication unit (5) and the channel modules/unit wherein broadcast can be performed inside this unit through a wire or wireless network. In another embodiment of the invention, wireless communication units (5) and the global location data organization units (4) are communicate with each other through the said network. Preferably this network uses a protocol such as TCP or UDP. By this means, the global location data organization unit (4) sends/receives data directly to any subscriber radio (2) through any one of the communication channels or in another embodiment it makes the wireless communication unit (5) perform this process by using station feature. When the wireless communication unit (5) undertakes the data package sending process, it automatically decides the sending channel and address with the dynamic addresses changing according to the occupancy as it is mentioned before. (hereinafter "address" means all kind of data describing receivers such as the channel, IP address to be communicated in this context). When the data package reaches the wireless communication unit (5) with the information describing the subscriber radio (2) to which the data is to be sent (for example by the global location data organization unit (4)) the packages are sent to the radios the dynamic addresses of which are registered in the related data storage unit.

In a further preferred embodiment of the invention, global location data organization unit (4) is adapted such that it will only use the automatic addressing feature of the wireless communication unit (5) in case there is no channel for global location communication and perform data transfer directly through this channel by not keeping the wireless communication unit (5) busy in case there is a dedicated channel.

In the preferred embodiment of the invention, the wireless communication unit (5) is adapted such that it will communicate through the related control channels with the subscriber radios (2).

In another preferred embodiment of the invention, there is at least one database (6) which is connected with the global location data organization unit (4) enabling addressing to be performed in the network by recording the addresses of the other device and systems including control (primary control, secondary control or auxiliary control), traffic and/or global location communication channel information dedicated to the subscriber radio(s) (2). Also the global location data organization unit (4) is adapted such that it can process the location information it acquires to the database (6). The said database (6) is present within the global location data organization unit (4) or on any cabled/wireless network or internet to which the global location data organization unit (4) is connected.

In the preferred embodiment of the invention, global location data organization unit (4) is adapted such that another subscriber radio (2) will transmit its location information right after a subscriber radio (2) transmits the independent location information upon the query is sent and this process will proceed for all radios (2).

In a preferred embodiment of the invention, global location data organization unit (4) is adapted such that it will broadcast addresses of all subscriber radios (2) the location information of which wanted to be acquired, dedicated location data acquiring channel, if exists, to which the said radios (2) will send the location information, location information sending sequence and waiting times between the location data sending in the global location query sent at once. The said waiting time is computed minimum as the time in which the radio (2) can send data before the next radio (2) will send the location data and by this means collisions are prevented.

In a preferred embodiment of the invention, global location data organization unit (4) is adapted such that it will broadcast the location information sending time as from the first radio (2) the location information of which is wanted to be acquired receives the query message in the global location query sent at once. All delays in the system are included to this time and the broadcast of global location messages is prevented until the query message reaches the farthest radio. This time, for example, is as much as it allows the query to pass from all repeaters (13) and by this means data loss is prevented.

In a preferred embodiment of the invention, global location data organization unit (4) is adapted such that it will start listening in order to acquire the responds that will come after it sends the global location query.

In another preferred embodiment of the invention, global location data organization unit (4) is adapted such that it will inform the other device and systems on the network it is located about its existence when it is required. For example it can state that there is a global location claimer in the system by sending its IP address to the broadcast IP address of each site in the system. By this means, for example global location information acquired by the repeaters (13) is sent directly to the IP address of the global location data organization unit (4) or the global queries are sent directly to the repeaters (13) and the radio station is not occupied in vain.

In a preferred embodiment of the invention, the repeaters (13) are adapted such that they will send the global location information they acquired directly to the IP address of the global location data organization unit (4) primarily or broadcast the query messages it receives.

In a further preferred embodiment of the invention, the repeaters (13) are adapted such that they will transmit the location query messages primarily in order to prevent or minimize the delays that can occur. For example, if there is a message which the repeater (13) is sending at the time, it transmits the location query right after sending it, if there is not, it transmits the query before putting the other packages into process.

In a further preferred embodiment of the invention, the repeaters (13) are adapted such that they will correct the timing errors than can occur by updating the subscriber radios (2) location information sending timings in the query message reaching to itself by subtracting its own delays from the recorded time in the message.

In a preferred embodiment of the invention, the wireless communication unit (5) is adapted such that such that it will update the global location data acquiring channel information in the query message sent by the global location data organization unit (4) to the wireless communication unit (5) placing the channel information dedicated for this process when it uses the automatic addressing feature since there is no channel dedicated for global location communication. By this means, wireless communication unit (5) works as a station even the communication cannot perform through a directly dedicated global location channel and broadcasts the query message.

In the preferred embodiment of the invention, the global location receiver (11) is a GPS module and adapted such that it will transmit the location information it determines to the global location data transmission unit (8).

In a preferred embodiment of the invention, the global location data transmission unit (8) is adapted such that it will enable the location information it receives from the global location receiver (11) to be transmitted to the main communication unit (3) through the communication unit (9).

In a further preferred embodiment of the invention, global location data transmission unit (8) is adapted such that it can transmit the global location information to the main communication unit (3) through the radio channel in the incoming query message stating also its own identity. By this means location information exchange is performed through the channel specified by the global location data organization unit (4) or the wireless communication unit (5) and the efficiency of the system is increased by enabling the channel not to be occupied in redundant numbers and unavailable times.

In a preferred embodiment of the invention, global location data transmission unit (8) has a timer (14) which is used to transmit global location information to the main communication unit (3) in accordance with the time required by its turn specified in the incoming query message, and which is preferably integrated to the global location data transmission unit (8).

The global location data transmission unit (8) is adapted such that it will activate the timer (14) in case the message is about the subscriber radio (2) on which it is located (if one of the target addresses in the message coincides with the device) by processing a query message coming preferably through a control channel to the communication channel (9), and will adjust it to the time transmitted in the query message.

In another preferred embodiment of the invention, the timer (14) is software or hardware based counter adapted such that it will perform the counting process until the determined time ends and will start the location information sending process by triggering the global location data transmission unit (8) when the time is over. The global location data transmission unit (8) continues to transmit the data packages normally until the time which the timer (14) is adjusted ends, and does not send location information. When the time is over, it resumes to normal operation status after sending the location information to the related channel by stopping the other data exchange.

The global location data transmission unit (8) is adapted such that it will adjust the timer (14) minimum to the sum of the time required by its turn, taking into consideration the time to wait between the radio's (2) starting time of sending message and the time for the next subscriber radio (2) sending.

In a preferred embodiment of the invention, the global location data organization unit (4) is adapted such that it can resend query when a time period is over as much as the multiplication of times to be waited between the transmissions with the sequence number of the last radio (this time the first radio is number 1) is added to the first waiting time as from the query transmission moment (the time passed until the first radio starts transmission). Thus, a new location query can be sent and the collisions are prevented after a time period in which all the radios (2) can transmit the location information completely as from the query transmission moment and after all the location information are acquired.

Figure 3:
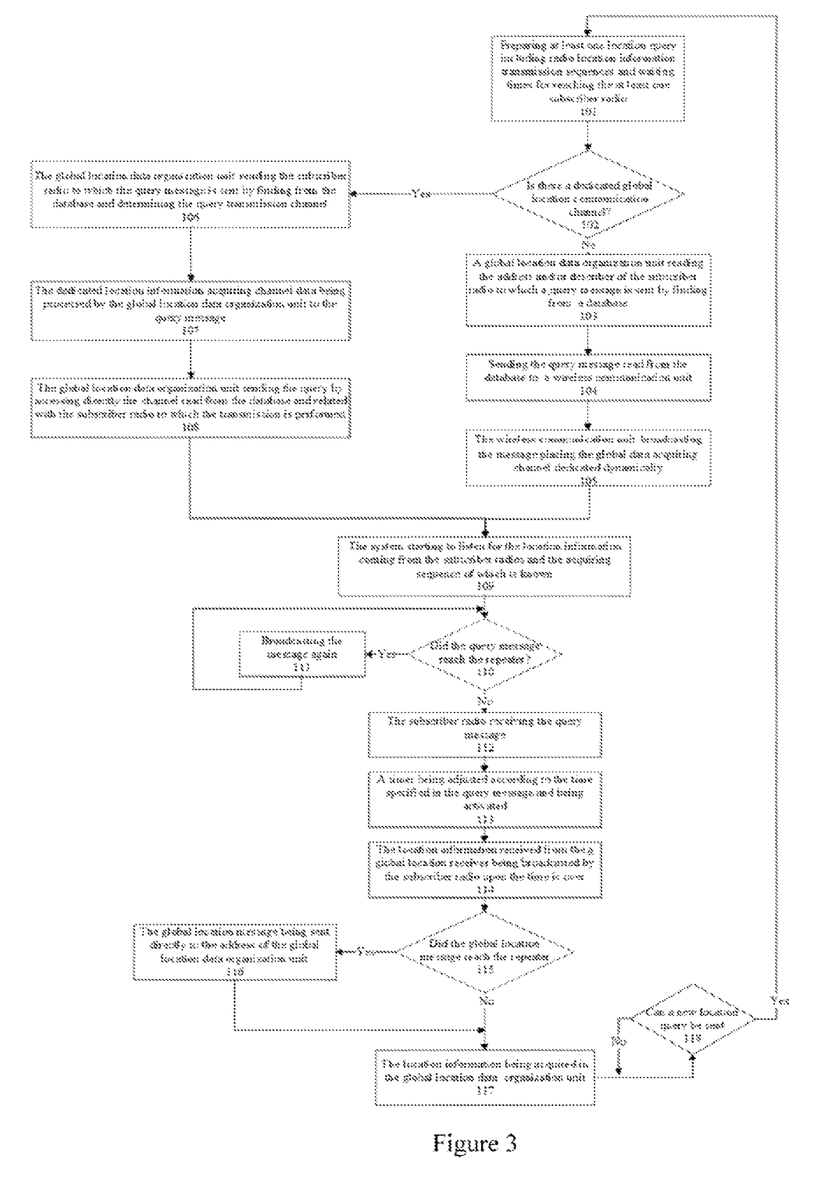
FIG. 3 is the process flowchart of the inventive accelerated location information acquiring method.

An accelerated location information acquiring method (100) realized to fulfill the objective of the present invention essentially comprises the steps of preparing at least one location query including radio location information transmission sequences and waiting times for reaching the subscriber radios (2) (101), is there a dedicated global location communication channel? (102), the global location data organization unit (4) reading the address and/or describer of the subscriber radio (2) to which the query message is sent by finding from the database (6) (103), sending the query message read from the database (6) to the wireless communication unit (5) by using the data related with the radio (2) to which the transmission is performed in order that it is transmitted to the desired radio (104), the wireless communication unit (5) broadcasting the message placing the global data acquiring channel dedicated dynamically for the radio (2) to be queried into the query message (105), the global location data organization unit (4) reading the subscriber radio (2) to which the query message is sent by finding from the database (6) and determining the query transmission channel (106), the dedicated location information acquiring channel data being processed by the global location data organization unit (4) to the query message (107), the global location data organization unit (4) sending the query by accessing directly the channel read from the database (6) and related with the radio (2) to which the transmission is performed (108), the system starting to listen for the location information coming from the radios (2) and the acquiring sequence of which is known (109), did the query message reach the repeater (13)? (110), broadcasting the message again (111), the subscriber radio(s) (2) receiving the query message (112), a timer (14) being adjusted according to the time specified in the query message and being activated (113), the location information received from the global location receiver (11) being broadcasted by the subscriber radio (2) upon the time is over (114), did the global location message reach the repeater (13)? (115), the global location message being sent directly to the address of the global location data organization unit (4) (116), the location information being acquired in the global location data organization unit (4) (117), and can a new location query be sent? (118) (FIG. 3).

In the preferred embodiment of the invention in step of preparing at least one location query including radio location information transmission sequences and waiting times for reaching the subscriber radios (2) (101), the query message including addresses of the all subscriber radios (2) broadcasted at once and the location information of which is wanted to be acquired, the location data acquiring channel to which the said radios (2) will send the location information, location information transmission sequences, the transmission time of the location information as from the first radio (2) the location information if which is wanted to be acquired receives the query message and waiting times between the transmissions of the location data are transmitted to the radios.

In the preferred embodiment the method (100) is divided into two with the step of is there a dedicated global location communication channel? (102) and in case there is a dedicated channel for the global location communication in the system, the global location data organization unit (4) reads the subscriber radio (2) to which the query message is sent by finding from the database (6) and finds the query transmission channel (106). Then it sends the query accessing the channel related with the radio (2) read from the database (6) and to which the transmission is performed (108), In this case, the known dedicated location information acquiring channel data is processed by the global location data organization unit (4) to the query message (107).

In case there is no channel dedicated for the global location communication in the system, the global location data organization unit (4) reads the address and/or describer of the subscriber radio (2) to which the query message is sent by finding from the database (6) (103). Then the query message read from the database (6) is sent to the wireless communication unit (5) by using the data related with the radio (2) to which the transmission is performed in order that it is transmitted to the desired radio (104). In the preferred embodiment of the invention, the wireless communication unit (5) broadcasts the message placing the global data acquiring channel dedicated dynamically for the radio (2) to be queried into the query message (105). By this means, the system is directed according to whether there is a dedicated channel for location communication or not, and in case there is no dedicated channel, the query is responded directly without occupying the wireless communication unit (5) used for example as a radio station. The location data to be sent acquiring channel is filled with the dedicated channel information, if there is, used for this process, if there is not, the wireless communication unit (5) decides this channel.

The waiting time between the transmissions is computed minimum as the time in which the radio (2) can send data before the next radio (2) will send the location data and by this means collisions are prevented. As from the first radio (2) the location information of which is wanted to be acquired receives the query message, the location information transmission time is as much as it allows the query to pass from all the repeaters (13), and by this means the data loss is prevented. When the transmission sequences of the radios (2) and the waiting times between the transmissions performed with sequence are known, the waiting time for the radios (2) from which the data is to be acquired before sending the location data is found by adding the multiplication of the transmission timings for all radio with the sequence numbers of the times to be waited (first radio number will be 0) to the transmission timing for each radio.

When the transmission sequences of the radios (2) and the waiting times between the transmissions performed with sequence are known, the waiting time for the radios (2) from which the data is to be acquired before sending the location data is found by adding the multiplication of the transmission timings for all radio with the sequence numbers of the times to be waited (first radio number will be 0) to the transmission timing for each radio.

In the preferred embodiment of the invention, before the step of the subscriber radio(s) (2) receiving the query message (105), there is a step of did the query message reach the repeater (13)? (110). If the receiver which the query message reach is a repeater (13), the starting time for location data transmission in the query message is renewed subtracting the time stemming from the delay of the related repeater (13) and the message is broadcasted again (111). The time is renewed upon the related query message reach any repeater and the inconsistencies in the system will be eliminated. In case there is a plurality of repeaters in the transmission line, the step of renewing the time in the query message and broadcasting the message again (111) is repeated. The receiver not being a repeater means that the message reaches a terminal radio (2) and the method (100) proceeds with the steps of the subscriber radio(s) (2) receiving the query message (112), a timer (14) being adjusted and activated according to the time specified in the query message (113), the location information being broadcasted by the subscriber radio (2) upon the time is over (114), and the location data being acquired in the global location data organization unit (4) (117).

In the step of adjusting and activating the timer (14) according to the time specified in the query message (113), the timer (14) on a subscriber radio (2) is adjusted to the time specified in the message and related with the radio (2). And in the step of the location information being broadcasted by the subscriber radio (2) upon the time is over (107), in other words it is time to inform location, it broadcasts the location (GPS) data including latitude, longitude and height information as a global location message through the channel in the incoming message.

In the preferred embodiment of the invention, before the step of acquiring the location information in the global location data organization unit (4) (117), there is control of did the global location message each the repeater (13)? (115). And if the receiver to which the global location message is transmitted is a repeater (13), the global location message is directly sent to the address of the global location data organization unit (4) (116) and it is proceeded with the step of acquiring the location data in the global location data organization unit (4) (117). A plurality of repeaters being in the transmission line doe not change the status and it is moved to the next step. The receiver not being a repeater means that the message reaches the main communication unit (8) and the method (100) proceeds again with the step of acquiring the location data in the global location data organization unit (4) (117).

In the step of acquiring the location data in the global location data organization unit (4) (117) which is the last step of the method (100), the said data acquired in the preferred embodiment of the invention are recorded to the database (6).

In the preferred embodiment of the invention, after the step of acquiring the location data in the global location data organization (4) (117), there is the step of can a new query be sent? (118), and if the conditions are suitable the method starts over upon request such that a new query will be sent. In order to take this decision, the multiplication of the time waited between the transmissions with the sequence number of the last radio (this time the first radio will be no. 1) is added to the first waiting time (the time passing until the first radio starts transmission) again, and if this time is over, a new query transmission is allowed starting over to the process.

Consequently, all the radios (2) wait for the time that passes for the radio (2) transmitting the first data (no transmission is performed) and at the end of the said time the radios (2) send the location information with the timings required by their sequence starting from the first radio (2). Thus, an accelerated location information acquiring system and method wherein the locations of the subscribers (2) can be acquired in turn sending location queries to a plurality of radios (2) at once; which makes the channel use more efficient, shortens the time passing in channels and which can perform global location data transmission swiftly is realized.

Within the scope of this basic concept, it is possible to develop a wide variety of embodiments of the inventive the accelerated location information acquiring system (1) and method (100). The invention can not be limited to the examples described herein; it is essentially according to the claims.

The invention claimed is:
1. A location information acquiring system, comprising
at least one main communication unit which realizes wireless digital data communication through at least one channel, has at least one wireless communication unit connected to at least one wireless communication antenna,
at least one subscriber radio which has at least one communication unit and at least one global location receiver that is in communication with the main communication unit through the communication unit and that acquires current location information,
at least one repeater which is adapted such that they will correct timing errors that can occur by updating the subscriber radios location information sending timings in the query message reaching to itself by subtracting its own delays from the recorded time in the message, repeats signals it receives and enables the main communication unit to communicate with a subscriber radio that is out of range,
at least one global location data organization unit which communicates with the wireless communication unit, and the at least one global location data organization unit is adapted to send location queries to more than one subscriber radio at the same time and to acquire the location information of the subscriber radios one by one, and the at least one global location data organization unit is adapted such that it will perform location information communication through the wireless communication unit in a case there is no dedicated channel for global location communication and perform location information communication through a dedicated located data channel directly without using the wireless communication unit;
at least one global location data transmission unit which is adapted to perform location information transmission process when subscriber radio's turn comes and receive the location queries from the global location receiver, and at least one timer that is in connection with global location data transmission unit and can follow an adjusted time of subscriber radio's turn, and adapted such that it will start the transmission of location data triggering the global location data transmission unit when the time it is adjusted is over.
2. The location information acquiring system according to claim 1, wherein the main communication unit is adapted such that data receive and transmission will be performed, and the main communication unit has interface equipment selected from a group consisting of microphone/loudspeaker, monitor and text entry.
3. The location information acquiring system according to claim 2, wherein the wireless communication unit is adapted such that it will broadcast and receive from a data channel working in at least one frequency; the wireless communication unit is adapted such that it will broadcast from at least one control channel wherein various commands can be sent to the subscriber radios and/or at least one traffic channel wherein the subscriber radios can transfer data in between each other; and the wireless communication unit is adapted such that it will communicate through the related control channels with the subscriber radio; and the wireless communication unit has a receiver/transmitter compatible with a trunked radio systems.

4. The location information acquiring system according to claim 2, wherein the wireless communication unit is adapted such that it will assign automatically channel information of a registered subscriber radio in communication with the system in order to prevent confusion in the lines according to the channel occupancy; the wireless communication unit has a storage field that is an internal or any cabled/wireless network or an online database wherein the current channel and/or address information dedicated for the subscriber radio will be stored; and the wireless communication unit is adapted such that it will distribute data packages coming with an information describing the subscriber radio to which the data will be sent, to the subscriber radios in the related data storage field through various data channels by acquiring and arranging the data packages as radio station.

5. The location information acquiring system according to claim 1, wherein the communication unit enables the subscriber radio to communicate data with the main communication unit, and to receive and send data to the subscriber radio through the main communication unit; the communication unit has a receiver/transmitter compatible with a trunked radio systems and; the communication unit is adapted such that it will broadcast and receive broadcast from at least one data channel working in various frequencies wherein the communication can be performed compatible with the main communication unit.

6. The location information acquiring system according to claim 1, wherein the global location data organization unit is adapted such that it will communicate with the wireless communication unit, and channel modules and the repeaters can broadcast and receive in the said unit, through wire or wireless network.

7. The location information acquiring system according to claim 3, wherein at least one database connected with the global location data organization unit is adapted such that it will enable addressing within the network keeping the records of the addresses of other device and systems on the network including channel information which comprises control and traffic channel dedicated to the subscriber radio; and present internally in the global location data organization unit or located on any cabled/wireless network or internet to which the global location data organization unit is connected.

8. The location information acquiring system according to claim 3, wherein the global location data organization unit is adapted such that it will enable a subscriber radio to transmit its own location information right after transmitting independent subscriber radio location information upon query and enable this process to be proceeded for all the subscriber radios that will send location data; and the global location data organization unit is adapted such that it will broadcast addresses, location information transmission sequences and waiting times between the location data transmissions of the subscriber radio(s), the location information of which is wanted to be acquired, in the global location data sent at once.

9. The location information acquiring system according to claim 3, wherein the global location data organization unit is adapted such that it can process the acquired location information to at least one database, and the global location data organization unit is adapted such that it will prepare location queries as Trunking Signalling Block (TSBK) and send them.

10. The location information acquiring system according to claim 4, wherein the global location data organization unit is adapted such that it will compute the waiting time between the transmission as the time in which the subscriber radio transmits the data before the next subscriber radio sends the location data in order to prevent collisions; the global location data organization unit is adapted such that it will broadcast the location information transmission time as from the first subscriber radio, the location information of which is wanted to be acquired, receives the query message in the global location query sent at once; the global location data organization unit is adapted such that it will broadcast the location information transmission time computing all the delays in the system as from the first subscriber radio, the location information of which is wanted to be acquired, receives the query message in order to prevent data loss; the global location data organization unit is adapted such that it will inform the other device and systems on the network it is located about its presence.

11. The location information acquiring system according to claim 3, wherein the repeater is adapted such that it will send the global location information it acquires directly to the global location data organization unit and/or broadcast the query messages it receives; the repeater is adapted such that it will transmit the location query messages primarily in order to prevent or minimize the delay that can occur; and the repeater is adapted such that it will update the time information recorded in the query message it receives by subtracting its own delay from the said time in order to prevent timing errors that can occur.

12. The location information acquiring system according to claim 3, wherein the wireless communication unit is adapted such that it will receive data and broadcast from a dedicated channel for global location data communication in order to occupy a minimum number of radio channels while sending location query and acquiring location data; and the repeater is adapted such that it will update the global location data acquiring channel information in the query message of the global location data organization unit placing the channel information to be used at that time for the said process.

13. The location information acquiring system according to claim 1, wherein the global location receiver is adapted such that it will transmit the location information which it determines to the global location data transmission unit.

14. The location information acquiring system according to claim 1, wherein the global location data transmission unit is adapted such that it will perform the transmission of the location information which it receives from the global location receiver to the main communication unit through the communication unit; and the global location data transmission unit is adapted such that it will transmit the global location information to the main communication unit through the radio channel in the incoming query message stating the identity of the subscriber radio on which it is located.

15. The location information acquiring system according to claim 1, wherein an internal timer is integrated to the global location data transmission unit and the internal timer is adapted such that it will start the transmission of location data triggering the global location data transmission unit when the time it is adjusted is over.

16. The location information acquiring system according to claim 7, wherein the global location data transmission unit is adapted such that it will continue to transmit the data packages normally until it triggers the timer and will not send location data; and the global location data transmission unit is adapted such that it will transmit the location data to the related channel stopping the other data exchange upon the time to which the timer is adjusted is over and it is triggered.

17. The location information acquiring, system according to claim 5, wherein the global location data organization unit is adapted such that it will perform query again after the time in which all the subscriber radios can transmit their location information as from the moment of query transmission.

18. A location information acquiring method, which is adapted such that it will perform location information communications though a wireless communication unit in a case there is no dedicated channel for global location communication and perform location information communication through a dedicated location data channel directly without using a wireless communication unit, comprising the steps of:
preparing at least one location query including radio location information transmission sequences and waiting times for reaching at least one subscriber radio,
controlling "is there a dedicated global location communication channel?",
a global location data organization unit reading the address and/or describer of the subscriber radio to which a query message is sent by finding from the database,
sending the query message read from the database to a wireless communication unit by using the data related with the subscriber radio to which the transmission is performed in order that it is transmitted to the desired radio,
the wireless communication unit broadcasting the message placing the global data acquiring channel dedicated dynamically for the subscriber radio to be queried into the query message,
the global location data organization unit reading, the subscriber radio to which the query message is sent by finding from the database and determining the query transmission channel,
the dedicated location information acquiring channel data being processed by the global location data organization unit to the query message,
the global location data organization unit sending the query by accessing directly the channel read from the database and related with the subscriber radio to which the transmission is performed,
the system starting to listen for the location information coming from the subscriber radios and the acquiring sequence of which is known,
controlling "did the query message reach the repeater ?",
broadcasting the message again,
the subscriber radio(s) receiving the query message,
a timer being adjusted according to the time specified in the query message and being activated,
the location information received from the global location receiver being broadcasted by the subscriber radio upon the time is over,
controlling "did the global location message reach the repeater ?",
the global location message being sent directly to the address of the global location data organization unit,
the location information being acquired in the global location data organization unit,
controlling "can a new location query be sent?".

19. The location information acquiring method according to claim 18, wherein in the step of preparing at least one location query including radio location information transmission sequences and waiting times for reaching the subscriber radios, a query message comprising addresses of all the subscriber radios broadcasted at once and the location information of which is wanted to be acquired, the transmission time of the location information as from the first subscriber radio the location information of which is wanted to be acquired receives the query message and waiting times between the transmissions of the location data are transmitted to the subscriber radios.

20. The location information acquiring method according to claim 18, wherein in the step of preparing at least one location query including radio location information transmission sequences and waiting times for reaching the subscriber radios, the waiting time between the location information transmissions is computed minimum as the time in which the subscriber radio can send data before the next subscriber radio sends the location data.

21. The location information acquiring method according to claim 18, wherein in the step of preparing at least one location query including radio location information transmission sequences and waiting times for reaching the subscriber radios, the first subscriber radio, the time of the location information of which is wanted to be acquired, starting to transmit location information as from it receives the query message is adjusted minimum as it will allow the query to pass from all repeaters.

22. The location information acquiring method according to claim 18, wherein in the step of preparing at least one location query including radio location information transmission sequences and waiting times for reaching the subscriber radios, the waiting time for the subscriber radios from which the data is to be acquired before sending the location data is found by adding the multiplication of the time to be waited between the transmissions with the sequence number (the first radio being number 0) to the first waiting time.

23. The location information acquiring method according to claim 18, wherein the step of "can a new query be sent?" gives positive result after a time is over in which only the location information of all subscriber radios can be completely transmitted completely in turn as from the moment of query transmission and after all location information are acquired.

\* \* \* \* \*